G. J. RHEUBAN.
VEHICLE TIRE.
APPLICATION FILED MAR. 18, 1918.
1,316,186.
Patented Sept. 16, 1919.
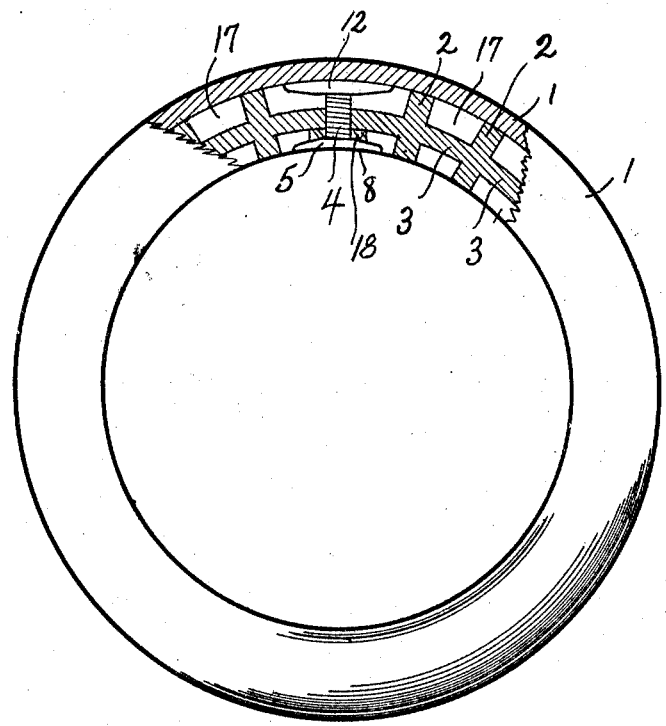
FIGURE 1
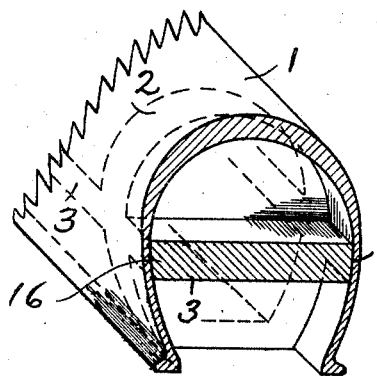
·FIGURE 2·
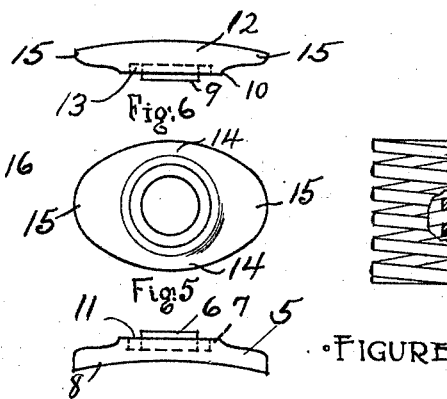
·FIGURE 3·
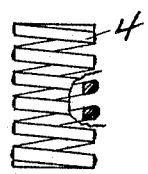
·FIGURE 4·
Witnesses
J. M. Jones
J. B. Harpman
Inventor
G. J. Rheuban
By
C. A. Harpman, Attorney
THE COLUMBIA PLANOGRAPH CO., WASHINGTON, D. C.

UNITED STATES PATENT OFFICE.

GEORGE J. RHEUBAN, OF YOUNGSTOWN, OHIO, ASSIGNOR OF ONE-HALF TO ISRAEL J. TATRO, OF YOUNGSTOWN, OHIO.

VEHICLE-TIRE.

1,316,186.　　　　Specification of Letters Patent.　　Patented Sept. 16, 1919.

Application filed March 18, 1918. Serial No. 223,015.

*To all whom it may concern:*

Be it known that I, GEORGE J. RHEUBAN, a citizen of the United States, residing at Youngstown, in the county of Mahoning and State of Ohio, have invented certain new and useful Improvements in Vehicle-Tires, of which the following is a specification.

This invention concerns tires for vehicles and more particularly cushion tires.

The principal object of the invention is to provide a tire comprising an outer casing, reinforced within by elastic piers spaced apart, and elastic bridges between said piers.

Another object is to provide coil springs formed of square bar steel which are inserted between every third or fourth pier, the inner ends of said springs resting upon seats formed of elastic material, the outer ends fitting into elongated caps formed of elastic material.

A still further object is to provide short elastic piers, said piers formed about the inner ends of said springs, the outer ends fitting underneath the above mentioned bridges and the inner ends fitting upon the above mentioned seats.

I am aware that, heretofore, various devices have been employed in constructing cushion tires and I do not broadly claim the elements generally entering into my improved tire, but I do believe that the specification and structure, hereinafter set forth does show a tire of novel construction, more economical in construction, more durable and possessing a desired amount of resiliency.

In the drawing like numerals refer to like parts throughout the drawings.

Figure 1 is a side elevation partly in longitudinal section.

Fig. 2 is a detail perspective view of the tire.

Fig. 3 is an enlarged detail view showing the support for the base of the spring.

Fig. 4 is a detail view of the spring with part cut away.

Fig. 5 is an enlarged detail view of the cap of the spring.

Fig. 6 is a side view of the cap of said spring.

By referring to Fig. 1 it will be seen that my improved tire comprises an outer casing 1. Within said casing 1 are situated elastic piers 2 spaced apart. These elastic piers 2 are reinforced by elastic bridges 3 formed between the piers 2. See Figs. 1 and 2.

By referring to Fig. 1 it will be seen that I have provided coil springs 4 formed of square bar steel which are inserted in place of the piers 2 at such distances as desired. The inner ends of said springs 4 rest upon base members 5. These base members 5 have their bottom surfaces 8 arched so as to conform with the inner circumference of the tire.

By referring to Fig. 3 it will be seen that these base members 5 are provided with bosses 6 and circular ribs 7. The inner ends of springs 4 rest within the circular grooves 11 which are formed between the bosses 6 and the circular ribs 7.

The outer ends of springs 4 are provided with caps 12.

By referring to Figs. 5 and 6 it will be seen that these caps 12 are provided with bosses 9 and circular ribs 10.

Between the boss 9 and the circular rib 10 is formed a circular groove 13. The outer ends of the springs 4 when installed fit into the said circular grooves of the cap members 12.

It will be seen by referring to Figs. 5 and 6 that the caps 12 are elliptical in form, the rims 14 and 15 tapering toward the circumference of the same.

By referring to Fig. 1 it will be seen that the caps 12 have the extended portions of the rim 15 projected toward the adjacent piers 2. The caps 12 are formed of material less elastic than the piers 2, thereby giving the outer casing 1 desired protection from the pressure of the springs 4.

By referring to Fig. 2 it will be seen that the piers 2 are correspondingly shaped and secured to the inner surface of the casing 1, taking the form of the inside of said casing 1. The bridges 3 extend across the central portion of the casing 1 and the edges 16 fit and adhere to the side walls of the casing 1. It will be seen by referring to Fig. 1 that the air cells 17 are formed above the bridges 3 and between the piers 2 thereby making the tire more elastic and sensitive to pressure. It will be seen by referring to Fig. 1 that I have provided short elastic piers 18 surrounding the inner ends of the springs 4.

Having thus described my improved tire what I claim as new and desire to secure by Letters Patent is:

1. A tire comprising an outer casing and a plurality of elastic piers, elastic bridges joining said piers midway between their outer and inner ends, a plurality of coil springs formed of square bar steel inserted perpendicularly within said casing, seats for said springs, caps for the outer ends of said springs substantially as described and for the purpose set forth.

2. A device of the class described, having in combination with an outer casing, a plurality of elastic piers, elastic bridges, and coil springs, elliptical shaped caps to fit the outer ends of said springs, seats for said springs, said seats having arched surfaces to conform with the inner circumference of said casing, substantially as described and for the purpose set forth.

3. A device of the class described, having in combination with an outer casing, a plurality of elastic piers, elastic bridges, and coil springs, elliptical shaped caps to fit the outer ends of said springs, seats for said springs, said seats having arched surfaces to conform with the inner circumference of said casing, short piers surounding the inner ends of said springs, substantially as described and for the purpose set forth.

In testimony whereof I affix my signature in the presence of two witnesses.

GEORGE J. RHEUBAN.

Witnesses:
ISRAEL J. TATRO,
ELMER WM. MORAN.

Copies of this patent may be obtained for five cents each, by addressing the "Commissioner of Patents, Washington, D. C."